United States Patent [19]
Carter

[11] Patent Number: 5,964,499
[45] Date of Patent: Oct. 12, 1999

[54] DOOR-MOUNTED GASKET FOR COMB-TYPE REAR FRAME

[75] Inventor: Daniel E. Carter, Savannah, Ga.

[73] Assignee: Great Dane Limited Partnership, Chicago, Ill.

[21] Appl. No.: 08/608,549

[22] Filed: Feb. 28, 1996

[51] Int. Cl.$^6$ ........................................................ B60J 7/00
[52] U.S. Cl. ........................... 296/181; 296/183; 16/392; 49/368
[58] Field of Search ..................................... 296/181, 183; 49/490.1, 495.1, 368; 16/221, 392, 387

[56] References Cited

U.S. PATENT DOCUMENTS

| | | | |
|---|---|---|---|
| 1,228,257 | 5/1917 | Stuck | 16/387 |
| 2,912,727 | 11/1959 | Sehn | 49/495.1 |
| 2,935,771 | 5/1960 | Hatcher | 49/495.1 |
| 3,407,537 | 10/1968 | Urbanick | 49/490.1 |
| 3,456,390 | 7/1969 | Hulverson | 49/495.1 |
| 3,485,523 | 12/1969 | Carr | 296/181 |
| 3,564,771 | 2/1971 | Reynolds | 49/383 |
| 3,886,686 | 6/1975 | Urbanick | 49/495.1 |
| 4,001,974 | 1/1977 | Wright | 49/495.1 |
| 4,119,325 | 10/1978 | Oakley et al. | 49/490.1 |
| 4,538,380 | 9/1985 | Colliander | 49/490.1 |
| 5,582,895 | 12/1996 | Dupuy et al. | 49/490.1 |

FOREIGN PATENT DOCUMENTS

| | | | |
|---|---|---|---|
| 786674 | 11/1957 | United Kingdom | 16/392 |
| 2235716 | 3/1991 | United Kingdom | 49/490.1 |

OTHER PUBLICATIONS

Laminators Incorporated, Omega Seal, 4 Pages, Hatfield, PA, date unknown.

Laminators Incorporated, The New Omega Triple–Seal Door, 1 Page, Hatfield, PA date unknown.

Maynard Plastics, Inc., Dual Durometer Extrusions, 2 Pages, Salem, MA, date unknown.

EPD Todco Swing Doors, sketch, 1 Page, date unknown.

Ship Secure True–Sealer Doors by Newcourt, Inc., 1 Page, date unknown.

Tru–Sealer Door Panels by Newcourt, Inc., 1 Page, date unknown.

Great Dane Trailers, Inc., Post drawings for hinge, 2 Pages, dated 1993, Vendor is Cressona, Inc.

BF Goodrich Company, Drawing C–PO1 C–12857, 1 Page, date unknown.

*Primary Examiner*—Joseph D. Pape
*Assistant Examiner*—Kiran Patel
*Attorney, Agent, or Firm*—Dority & Manning, P.A.

[57] ABSTRACT

An improved sealing device has a base platform supporting at least an inner sealing member and an outer sealing member. The outer sealing member has a main body portion of substantially uniform thickness along its height, which is taller than the inner sealing member. The improved sealing device can be used to seal the edges of doors that close the opening of a comb-style rear frame of a container, especially wherein the doors are mounted on universal hinges. Each universal hinge has a leaf portion defining a plane surface disposed to face the exterior surface of the door. Each hinge also has an off-set rearward portion, a normal leg and a parallel leg, wherein the hinge is configured such that each of the plane surface of the leaf portion and the edge of the door is disposed in a particular relationship when the door is closed.

28 Claims, 5 Drawing Sheets

DOOR-MOUNTED GASKET FOR COMB-TYPE REAR FRAME

BACKGROUND OF THE INVENTION

The present invention relates to closures for trailers and more particularly to a door-mounted gasket for a comb-type rear frame of a trailer.

A very successful rear frame for vehicles such as trailers is the so-called "comb-style" corner post assembly shown in U.S. Pat. No. 3,564,771, which hereby is incorporated herein by this reference. As shown therein, the geometry of the comb-type frame with its vertical member 6 consisting of an outer rear post 9 and an inner post 10 necessitates the use of a unique hinge that allows the door 5 to seal against the rear frame, as well as allowing the door to swing open around the comb 9 and lay flat against the side wall 3 of the vehicle body or container 1. As explained in this patent, the perimeter inside edges of the rear doors are provided with an EPDM sponge rubber compression style gasket that seals against inner post 10 when door 5 is swung into the closed position.

Another style of door gasket suitable for dry-freight applications is commonly referred to as a "flapper" gasket or a "wiper" gasket. This flapper gasket generally is composed of a dual durometer PVC or vinyl material. It has a channel-shaped hard section of material that acts as a carrier and fastens to the door plaque. Two soft sections of material are attached to the channel and disposed to wipe along the sealing surface of the rear frame. The outer seal lies on the outer surface of the frame and is the primary seal to keep moisture and such from entering the trailer. The inner seal is generally smaller and deforms against the inner sealing areas, thereby providing a barrier to prevent moisture and such from actually entering the cargo area of the trailer. In the space between the two flexible seals, a channel exists for the purpose of trapping moisture or contaminants that may pass by the outer seal and in theory ideally are stopped by the inner seal. Ideally, moisture and contaminants drain through the channel to the bottom, whence they can be expelled by gravity.

Because of the geometry of the comb-style rear post and hinge, existing flapper gasket configurations fail to perform the desired sealing functions. The geometry of the comb-style rear frame (with its unique hinged configuration and location of the hinge pin) causes the doors to approach the corner post sealing surface from more of a lateral direction as opposed to a conventional rear-to-front swing closure. This in turn causes the outer seal to hit the inner post in a manner causing the outer seal to turn inside instead of sliding to the outside to form a moisture barrier.

Thus, a trailer manufacturer desiring to meet a customer preference for a flapper gasket could not use a comb-style frame. While non-comb style rear frames use different style hinges and hinge pin locations that result in operation of the doors in a manner consistent with proper functioning of flapper gaskets, the customer must be willing to forego the advantages of the wrap around hinges and hinge pin location attributable to the comb-style rear frame. If such customer also preferred the advantages accruing to the unique comb-style rear frame and its hinge protective attributes, the manufacturer would be forced to use a so-called "notched" comb-style rear frame. However, since the "notched" comb-style rear frame uses the same style hinge as the non-comb, notches must be provided in the outer post in the region of the hinges to accommodate movement of the hinges when opening and closing the doors. This requires the manufacturer to produce and inventory three different types of outer posts for the rear frames. Moreover, from the manufacturer's perspective, the need to produce and inventory "notched" comb-style rear frames, including the different style hinges, is disadvantageous.

OBJECTS AND SUMMARY OF THE INVENTION

It is a principal object of the present invention to provide a dual durometer gasket and wrap-around hinge that operates with a comb-style rear frame and hinge pin geometry.

It is another principal object of the present invention to satisfy the desires of customers for a dual durometer gasket and a compression gasket without increasing the number of manufacturing specifications or the different type of inventory required to satisfy customer demands for products employing different types of sealing gaskets.

It is still a further principal object of the present invention to provide an improved dual durometer gasket compatible with comb-style rear frame and hinge pin geometry.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the apparatus of the present invention includes a rear frame assembly for a trailer or container having an opening at one end that is closed by at least one door, which is attached by a hinge assembly. The rear frame assembly includes a comb-style rear frame and an improved sealing device in further accordance with the present invention.

The improved sealing device includes a base platform that is configured for supporting elongated sealing members. The improved sealing device of the present invention further includes an elongated inner sealing member connected to the base platform and having a thickness that tapers away from the base platform toward the free end of the inner sealing member. The free end of the inner sealing member has a radiused surface and the inner sealing member desirably has a shape that curves toward the base platform.

The improved sealing device of the present invention further includes an elongated outer sealing member connected to the base platform and having a main body portion formed with a thickness that is substantially uniform as one proceeds away from the base platform toward the free end of the outer sealing member. The main body of the outer sealing member desirably has a shape that curves toward the inner sealing member and the base platform. The free end of the outer sealing member forms a foot portion that juts off to point away from the center of the base platform and terminates in a radiused surface. The inside surface of the foot portion of the outer sealing member forms a beveled surface adjacent the inside surface of the outer sealing member.

In a presently preferred embodiment of the improved sealing device of the present invention, an elongated intermediate sealing member is connected to the base platform between the inner and outer sealing members and has a thickness that tapers as one proceeds away from the base platform toward the free end of the intermediate sealing member. The free end of the intermediate sealing member has a radiused surface, and the intermediate sealing member desirably has a shape that curves toward the base platform and outer sealing member and away from the inner sealing member. The height and thickness of the intermediate sealing member are smaller than or equal to the respective heights and thicknesses of the inner sealing member.

Desirably, the durometer hardness of the material composing each of the inner sealing member, the outer sealing member, and the intermediate sealing member is equal to one another and less than the material composing the base platform. However, when the durometer hardness of the outer sealing member equals the durometer hardness of the inner sealing member, the stiffness of the outer sealing member nonetheless will be greater than the stiffness of the inner sealing member because of the greater thickness between the outside and inside surfaces of the outer sealing member. This uniform thickness of the outer sealing member contrasts with the more tapered thickness configuration of the inner sealing member.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
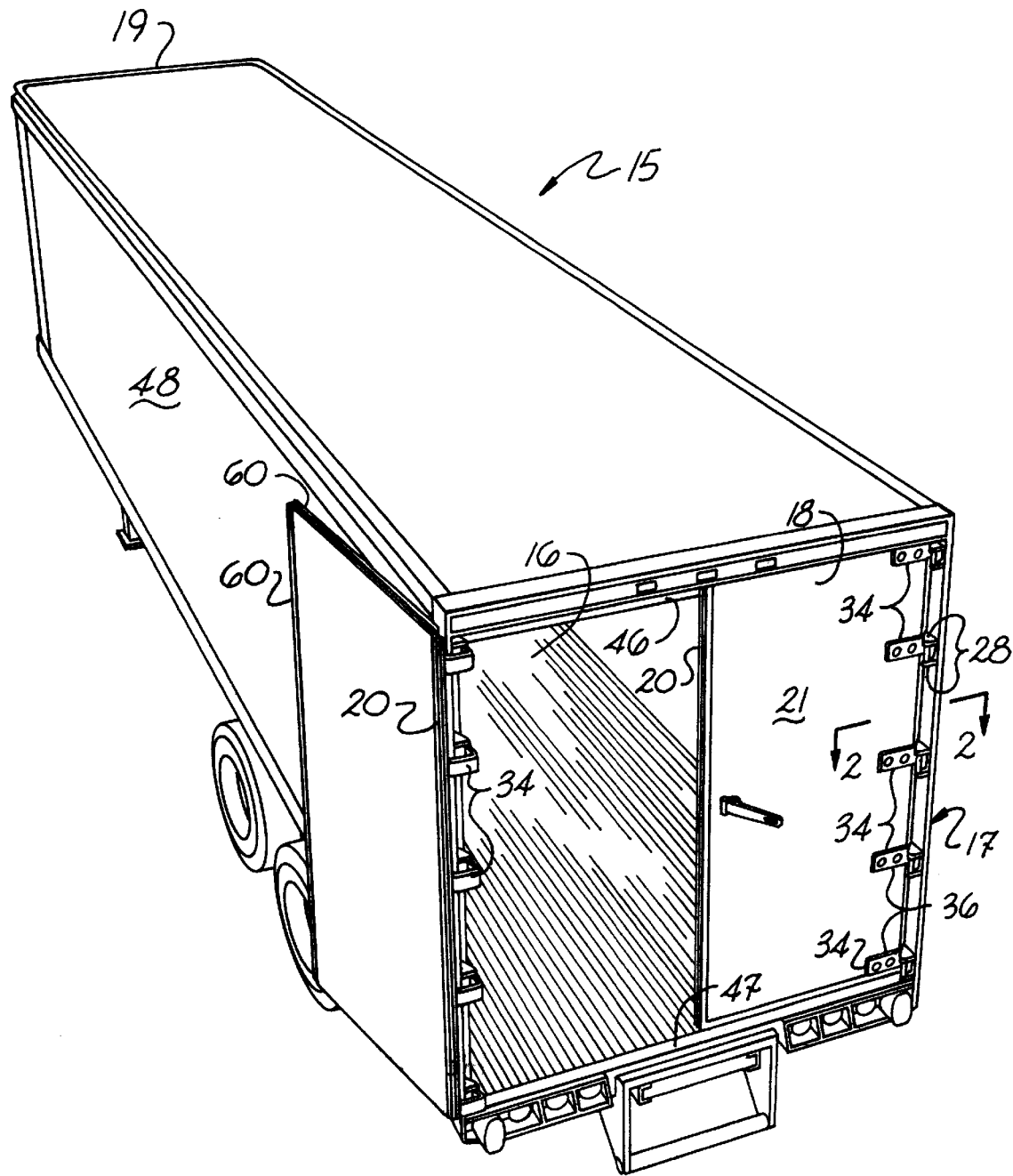
FIG. 1 shows an elevated perspective view of an embodiment of apparatus in accordance with the present invention.

As shown in FIG. 1 for example, an apparatus for transporting cargo can include a container. As embodied in the example shown in FIG. 1, the container can be provided in the form of a trailer indicated generally by the designating numeral 15. However, other forms of container can be provided, including cargo containers intended for rail transport, trailer transport, and overseas shipping transport. The container has an opening 16 at one end through which cargo can pass into and out of the interior of the container.

As shown in FIG. 1, a comb-style rear frame 17 defines the opening 16 of the container. The details of such rear frame are described in U.S. Pat. No. 3,564,771, which is hereby incorporated herein by this reference. The comb-style rear frame 17 includes a door mount assembly for attaching at least one door 18 that closes the opening 16 of the container. Door 18 has opposed exterior and interior planar surfaces 21, 33. The comb-style frame 17 is shown in a cross-sectional view in each of FIGS. 2 and 3, and includes a vertical assembly indicated generally by the numeral 20. The vertical assembly 20 includes a vertically extending inner post defining an inner wall 22 and a door receiving channel 42 extending generally transversely from inner wall 22 and defining an exterior surface 43 facing generally rearwardly. Door receiving channel 42 has one end connected to inner wall 22 by a rear corner 45. Inner wall 22 of the inner post has an exterior surface 23 disposed to face the interior of the container.

The vertical assembly 20 includes a vertically extending rear post 24 or comb member 24 disposed adjacent the inner post and rearwardly thereof away from the closed end 19 (FIG. 1) of the container. The comb member 24 includes a forward portion 35 configured to be connected to the container. The comb member 24 includes a rearward leg 25 extending rearwardly of where another end of door receiving channel 42 is connected to comb member 24. The rear-most edge of comb member 24 is bent inwardly (toward opening 16) to form a rear flange 26, which extends unbroken for the full length of the rear post (comb member) 24. Rear flange 26 is connected to rearward leg 25 and extends generally transversely to rearward leg 25.

Figure 2:
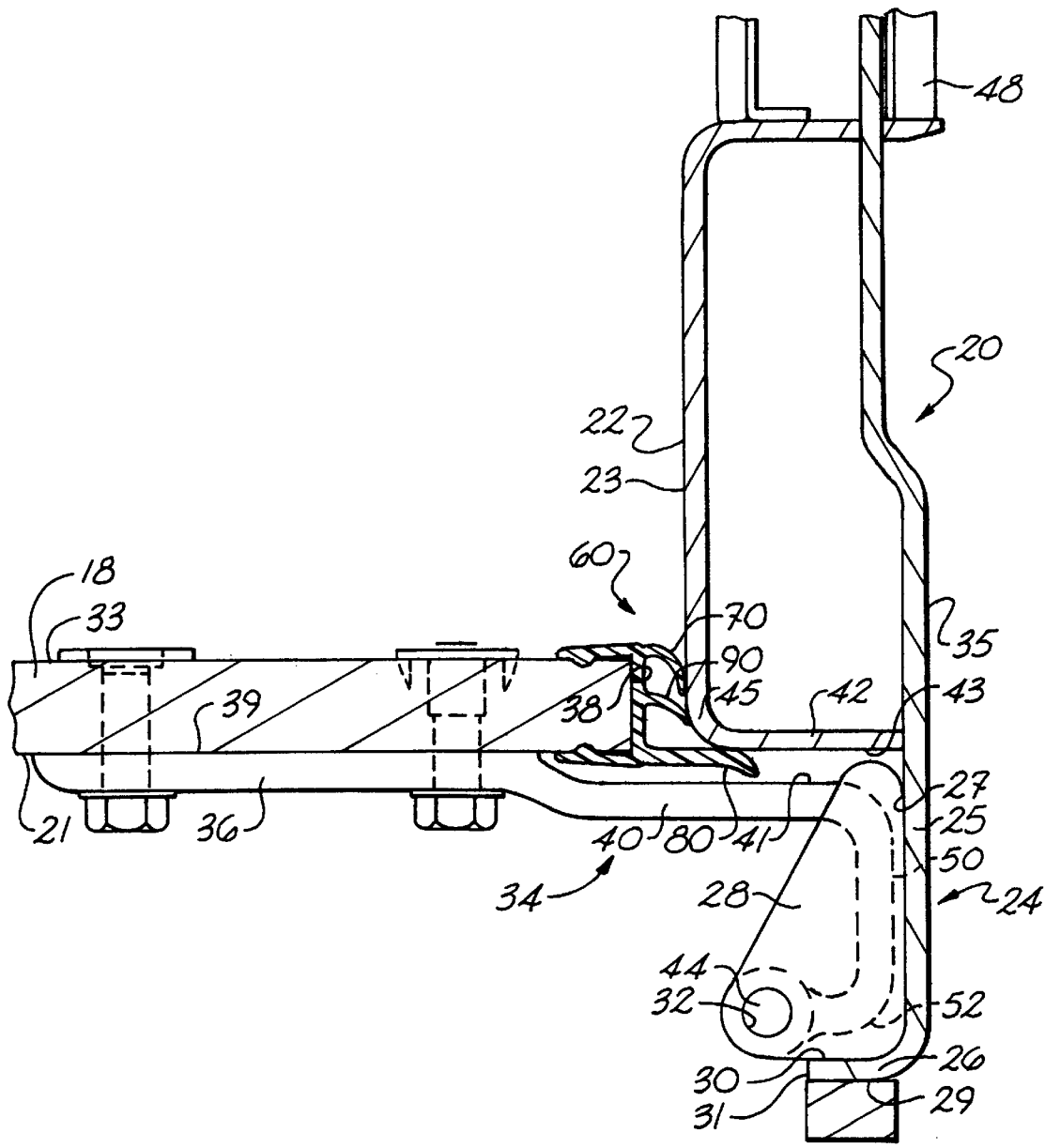
FIG. 2 shows a cross-sectional view taken in the direction in which arrows 2—2 point in FIG. 1.
Figure 3:
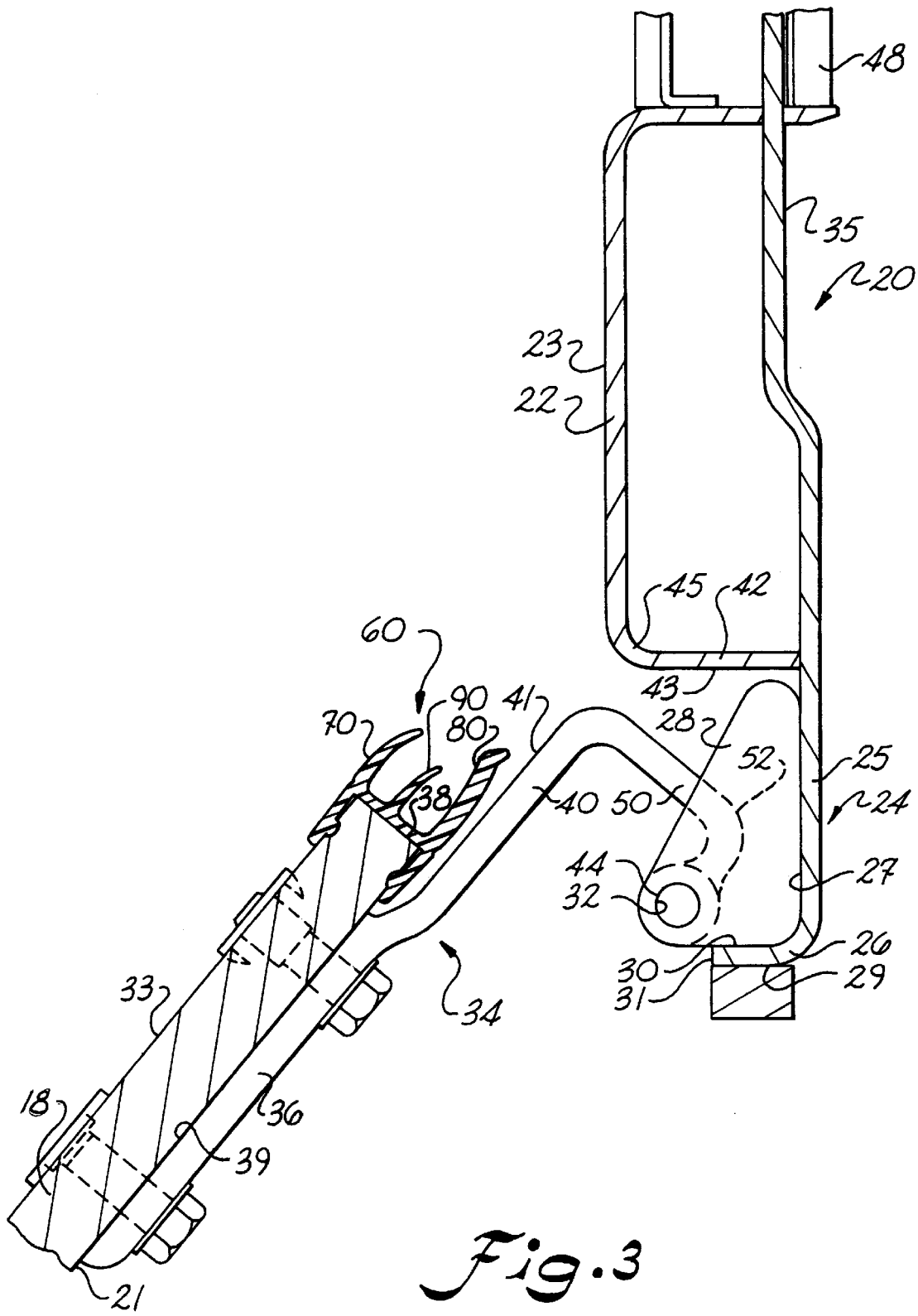
FIG. 3 shows an alternative orientation of the cross-sectional view of the apparatus shown in FIG. 2.

As shown in FIGS. 1–3, pairs of hinge butts 28 are welded into position against the inner face 27 of rearward leg 25. The abutting portions of the rear edge 29 of the butts 28 and the inner face 30 of the rear flange 26 are secured together. Each butt 28 extends inwardly beyond the inner edge 31 of the rear flange 26 and has a vertical hinge pin opening 32 in this extended portion. The hinge pin openings 32 are concentrically aligned in each pair of butts 28 so that the pin access is located inwardly of the edge 31 of the rear flange 26 and forwardly of the rear flange 26.

The door mount assembly includes at least one universal wrap-around hinge 34. Desirably, as shown in FIG. 1, a plurality of universal wrap-around hinges 34 are included in the door mount assembly. As shown in FIGS. 1–3, each universal hinge 34 has a leaf portion 36 that is in abutment with and secured to the exterior surface 21 of the door 18. For this purpose, leaf portion 36 has a plane surface 39 disposed to face the exterior surface 21 of the door 18. Leaf portion is further configured with a rearward portion 40 extending parallel and off-set rearwardly from the plane surface 39 of leaf portion 36.

Each universal hinge 34 is further configured with a normal leg 50 extending generally transversely to and connected at a right angle to off-set rearward portion 40 of leaf portion 36. Hinge 34 also is configured with a parallel leg 52 extending generally transversely to and having one end connected at a right angle to normal leg 50. Thus, parallel leg is disposed to extend generally parallel to rearward portion 40, which defines an inner surface 41 shown in FIGS. 2 and 3 for example. The other end of parallel leg 52 is a free end configured to be pivotally connected to the comb member 24, as by defining a hinge pin opening therein.

This wrap-around configuration of universal hinge 34 allows it to be connected to a door 18 in a manner that permits the hinge 34 to wrap around the comb-style rear frame 17 when the door 18 is opened (FIG. 1). The hinge pin 44 is located at the end of parallel leg 52, and thus is disposed with respect to the rear vertical member 24 so as to permit the door 18 to occupy a closed position that bridges the vehicle body opening 16, or half of it as the case may be. The rearward portion 40 of the leaf 36 is offset so as to clear the door receiving channel 42 of the inner post 22 of rear frame 17 when door 18 is disposed in the closed position (FIG. 2).

Importantly, as shown in FIG. 2 for example, the universal hinge 34 is configured such that the plane surface 39 of leaf portion 36 is disposed in substantially the same plane as the exterior surface 43 of door receiving channel 42 when normal leg 50 of the universal hinge 34 is disposed to face the rearward leg 25 of the comb member 24. Typically, this relationship can be achieved by coordinating the length of normal leg 50 relative to the magnitude of the offset between rearward portion 40 and plane surface 39 of leaf portion 36. Moreover, as shown in FIG. 2 for example, maintaining this relationship has the effect of disposing interior planar surface 33 of door 18 inwardly (i.e., forwardly) of the exterior surface 43 of door receiving channel 42 when door 18 closes opening 16. Accordingly, the peripheral edge 38 of the door 18 is disposed in substantial opposition to the exterior surface 23 of inner wall 22 of the inner post when the door is connected to leaf portion 36 and disposed to close the opening 16 in the container. Such configuration of universal hinge 34 permits it to be used interchangeably with doors sealed by conventional compression gaskets and with doors sealed with wiper gaskets such as the inventive wiper gasket configurations described below. This interchangeable attribute of universal hinge 34 reduces the inventory of hinges that a manufacturer of rear frames must carry in order to satisfy varying customer demands.

Figure 4:
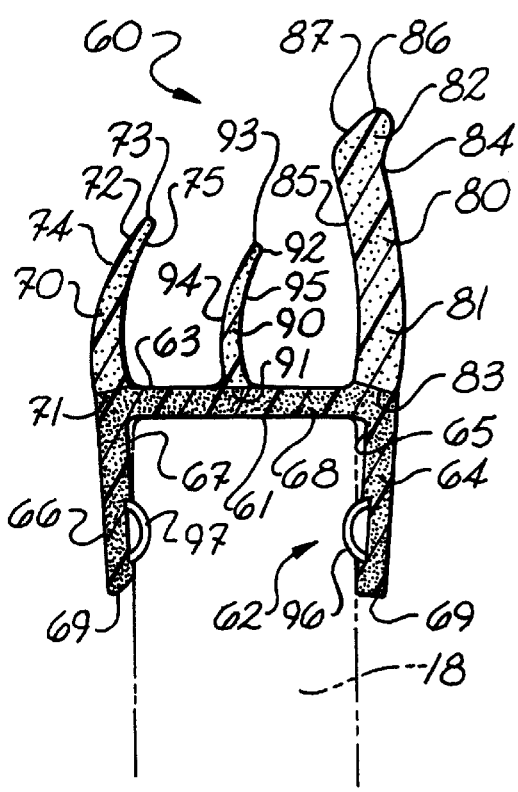
FIG. 4 shows a cross-sectional view of a preferred embodiment of apparatus in accordance with the present invention.
Figure 5:
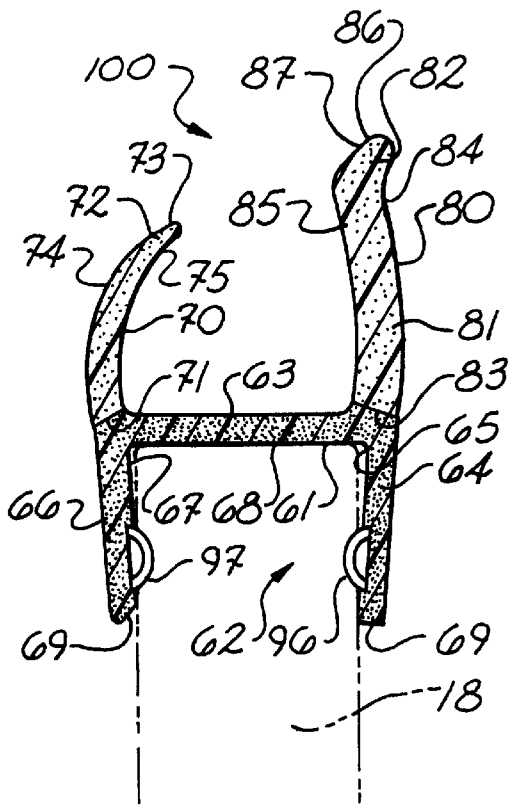
FIG. 5 shows a cross-sectional view of an alternative embodiment of apparatus in accordance with the present invention.

A section of the rear door 18 is shown in dashed line in each of FIGS. 4 and 5 for example. As shown in FIGS. 2 and 3, the door 18 has a free edge 38 defined around its periphery. This free edge 38 of the door 18 is provided with a gasket that becomes disposed in sealing pressure with the rear corner 45 of the inner post 22 of the rear vertical assembly 20 and with the top member 46 (FIG. 1) and bottom sill 47 (FIG. 1) when the door 18 closes the container opening 16. When in this closed position (FIG. 2 for example), the rear flange 26 of the vertical assembly 20 is the rear-most member of the assembly, thus providing impact protection to the door 18 and the door hinge 34. When closed, the door 18 is completely recessed and protected. Even if the hinge pins 44 were to shear off, the hinges 34 still will be within the space between the hinge butts 28, and the door 18 will remain supported by the rear vertical assembly 20. The full strength of the rear flange 26 is maintained, as it is continuous throughout its length with no cut out portions or notches that might otherwise be required for clearance of the hinge 34. As shown in FIG. 1, the hinge arrangement permits the door to swing through a full 270 degrees, to lie flat against the container sidewall 48 entirely out of the way of a loading or unloading operation. As the door swings open, the U-shaped recess formed in the hinge 34 by the off-set rearward portion 40, normal leg 50 and parallel leg 52 are configured to receive the rearwardly projecting end 24 and the rear flange 26 of the vertical assembly 20.

A preferred embodiment of the improved sealing device of the present invention is shown in FIGS. 1–4 and 6 and is represented generally by the numeral 60. An alternative embodiment of the improved sealing device of the present invention is shown in FIGS. 5 and 7, and is represented generally by the numeral 100.

As shown in FIGS. 4–7 for example, the improved sealing device of the present invention includes a base platform 62 that is configured for supporting elongated sealing members. The base platform 62 has a generally U-shaped transverse cross-section defining an outer leg 64 with an inside surface 65. The base platform 62 also includes an inner leg 66 with an inside surface 67 disposed to face the inside surface 65 of the outer leg 64. The base platform 62 still further includes a bridge member 68 extending between and being joined to each of the inner and outer legs 66, 64 of the base platform. Desirably, base platform 62 is composed of a material such as a rigid polyvinyl chloride (PVC) or vinyl having a durometer hardness of a predetermined magnitude, which is schematically represented in FIGS. 4 and 5 by the stippling. The magnitude of the durometer hardness of the base platform 62 is desirably Type Shore D 80. Base platform 62 is desirably configured with a slight bow-legged shape wherein the free ends 69 of each of the inner and outer legs 64, 66 are resiliently biased toward the bridge member 68. This is especially shown in each of FIGS. 4 and 5 wherein each of the inner and outer legs 64, 66 are biased against opposite faces of a section of rear door 18 (shown in dashed line) and thus secures base platform 62 to door 18. The back surface 61 of bridge member 68 of base platform 62 is configured to receive and abut against free edge 38 of door 18.

As shown in FIGS. 4–7, a first elongated and resilient bumper strip 96 is disposed along the length of inside surface 65 of outer leg 64 of base platform 62. Similarly, a second elongated and resilient bumper strip 97 is disposed along the length of inside surface 67 of inner leg 66 of base platform 62. Each of these resilient bumper strips 96, 97 desirably is composed of material having a durometer hardness that is much less than the durometer hardness of inner leg 66 and outer leg 64 of base platform 62. As shown in FIGS. 4 and 5, bumper strips 96, 97 assist in securing base platform 62 to free edge 38 of door 18.

As shown in FIGS. 4–7 for example, the improved sealing device of the present invention further includes an elongated inner sealing member 70. Desirably, as shown in FIGS. 4 and 5, a base end 71 of the inner sealing member 70 is connected to the front surface 63 of bridge member 68 of base platform 62 where the inner leg 66 joins the bridge member 68. The height of the inner sealing member 70 extends from its base end 71 to its free end 72, which is disposed opposite the base end 71. The free end 72 of the inner sealing member 70 is configured and disposed to curve toward the bridge member 68 and defines a radiused surface 73 that extends from the outside surface 74 of the inner sealing member 70 to the inside surface 75 of the inner sealing member. The free end 72 of the inner sealing member 70 is desirably disposed to curve toward the outer sealing member 80 (described below). The radiused surface 73 has an end radius of a predetermined magnitude, which is desirably 0.020 inches. However, other magnitudes can be used, depending on the dimensions of the door assembly.

Each of the outside surface 74 and inside surface 75 of the inner sealing member 70 forms a boundary that defines a thickness between the outside surface 74 and the inside surface 75. This thickness of the inner sealing member 70 gradually tapers from the base end 71 to the radiused free end 72. The outside surface 74 of the inner sealing member 70 desirably has a transverse cross-section that is shaped generally as a circular arc having a radius of a predetermined magnitude, desirably 0.69 inches for the example given. However, other magnitudes can be used, depending on the dimensions of the door assembly. The inside surface 75 of the inner sealing member 70 has a transverse cross-section shaped generally as a circular arc having a radius that desirably is different than the radius of the outside surface 74 of the inner sealing member 70. If the magnitude of the radius of the circular arc forming the transverse cross-section of the outside surface 74 of the inner sealing member 70 is 0.69 inches, then the complementary radius of the inside surface 75 of the inner sealing member 70 is desirably 0.63 inches.

Desirably, the inner sealing member 70 is composed of a material such as a flexible polyvinylchloride (PVC) or vinyl having a durometer hardness of a predetermined magnitude, which is schematically represented in FIGS. 4 and 5 by the stippling. The magnitude of the durometer hardness of the inner sealing member 70 is desirably Type Shore A 90, which is less than the range of the durometer hardness of the base platform 62.

As shown in FIGS. 4–7 for example, the improved sealing device of the present invention further includes an elongated outer sealing member 80. Desirably, as shown in FIGS. 4 and 5, outer sealing member 80 comprises a main body portion 81 and a foot portion 82. A base end 83 of main body portion 81 is connected to the front surface 63 of bridge member 68 of base platform 62 where the outer leg 64 joins the bridge member 68.

The main body portion 81 of outer sealing member 80 further defines an outside surface 84 and an inside surface 85 disposed opposite the outside surface 84. Each of the outside surface 84 and the inside surface 85 is disposed generally parallel to one another and separated by a substantially uniform thickness. Each of the outside surface 84 of main body portion 81 of outer sealing member 80 and the inside surface 85 of main body portion 81 of outer sealing member 80 has a transverse cross-section shaped generally in a curve disposed to bend toward the inner sealing member 70. The outside surface 84 of main body portion 81 of outer sealing member 80 desirably has a transverse cross-section that is shaped generally as a circular arc having a radius of a predetermined magnitude, desirably 2.11 inches for the example given. However, other magnitudes can be used, depending on the dimensions of the door assembly. The inside surface 85 of main body portion 81 of outer sealing member 80 has a transverse cross-section shaped generally as a circular arc having a radius that desirably is different than the radius of the outside surface 84 of the outer sealing member 80. If the magnitude of the radius of the circular arc forming the transverse cross-section of the outside surface 84 of the inner sealing member 80 is 2.11 inches, then the complementary radius of the inside surface 85 of the outer sealing member 80 is desirably 1.95 inches.

The height of the outer sealing member 80 extends from its base end 83 to its foot portion 82, which is disposed opposite the base end 81 and at the free end of the main body portion 81. Moreover, the height of outer sealing member 80 desirably is greater than the height of inner sealing member 70.

The foot portion 82 of the outer sealing member 80 defines a radiused surface 86 and a beveled surface 87. The radiused surface 86 extends from the outside surface 84 toward the beveled surface 87. The radiused surface 86 has an end radius of a predetermined magnitude, which is desirably 0.047 inches. However, other magnitudes can be used, depending on the dimensions of the door assembly.

In addition to the radiused surface 86, the foot portion 82 also further defines a beveled surface 87 that extends from the inside surface 85 toward the outside surface 84 and to the radiused surface 86. Beveled surface 87 is desirably disposed at an angle of about 45 degrees with respect to a line drawn normal to the front surface 63 of bridge member 68 of base platform 62.

The outer sealing member 80 is desirably composed of a material such as a flexible polyvinylchloride (PVC) or vinyl having a durometer hardness of a predetermined magnitude, which is schematically represented in FIGS. 4 and 5 by the stippling. Desirably, the outer sealing member 80 is composed of material having a durometer hardness that is less than the durometer hardness of the base platform 62 and substantially the same as the durometer hardness of the inner sealing member 70. Moreover, in embodiments in which the durometer hardness of the base platform 62 on the one hand differs from that of the inner and outer sealing members 70, 80 on the other hand, a dual durometer device is provided by the present invention. However, the inner sealing member 70 can have a different durometer hardness than the outer sealing member 80, and this durometer hardness can be more or less than the durometer hardness of the outer sealing member 80. When the durometer hardness of the outer sealing member 80 equals the durometer hardness of the inner sealing member 70, the stiffness of the outer sealing member 80 nonetheless will be greater than the stiffness of the inner sealing member 70 because of the greater thickness between the outside surface 84 and the inside surface 85 of the outer sealing member 80. This uniform thickness of the outer sealing member 80 contrasts with the more tapered thickness configuration of the inner sealing member 70. The magnitude of the durometer hardness of the outer sealing member 80 is desirably Type Shore A 90.

Figure 6:
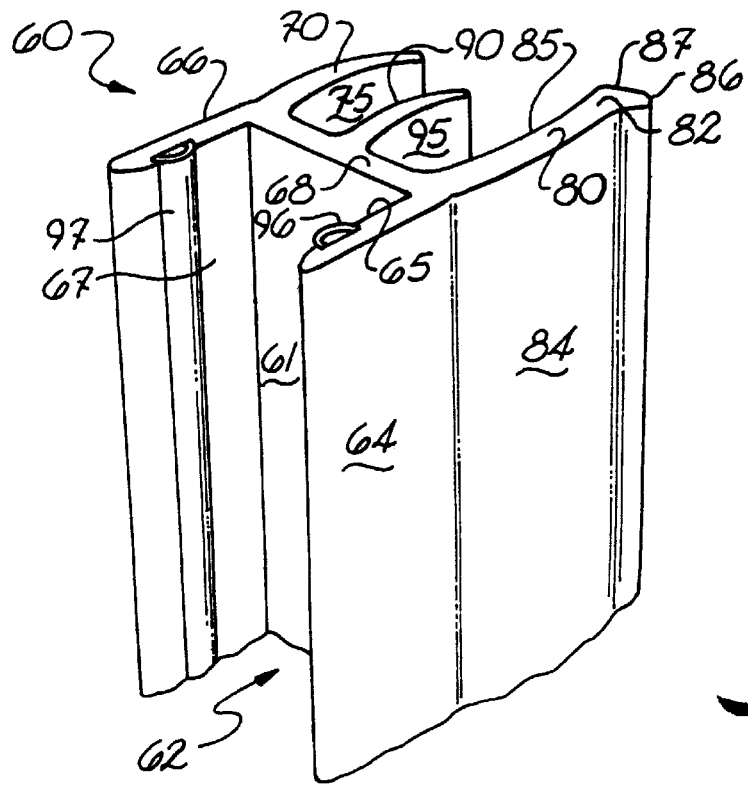
FIG. 6 shows an elevated perspective view of a preferred embodiment of the apparatus shown in cross-section in FIG. 4.
Figure 7:
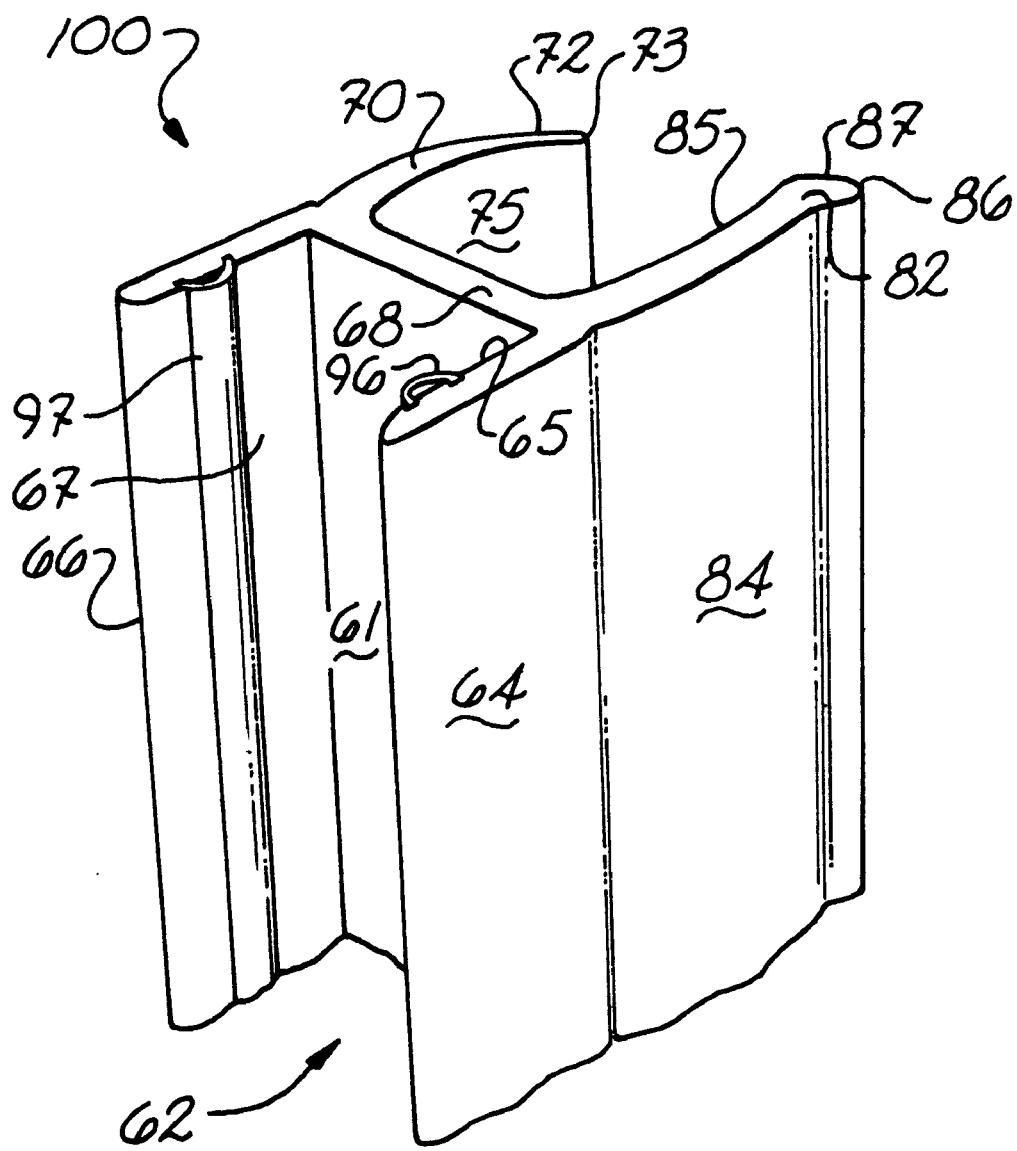
FIG. 7 shows an elevated perspective view of an alternative embodiment of apparatus in accordance with the present invention shown in cross-section in FIG. 5.

As shown in FIGS. 4 and 6 for example, a presently preferred embodiment of the improved sealing device of the present invention further includes an elongated intermediate sealing member 90. Desirably, as shown in FIG. 4, a base end 91 of the intermediate sealing member 90 is connected to the front surface 63 of bridge member 68 of base platform 62 between where the inner leg 66 and outer leg 64 join the bridge member 68. Desirably, intermediate sealing member 90 is disposed about midway between outer sealing member 80 and inner sealing member 70. The height of the intermediate sealing member 90 extends from its base end 91 to its free end 92, which is disposed opposite the base end 91. Moreover, the height of intermediate sealing member 90 desirably is less than or equal to the height of inner sealing member 70, which desirably has a height that is less than the height of outer sealing member 80.

The free end 92 of the intermediate sealing member 90 is configured and disposed to curve toward the outer sealing member 80 and defines a radiused surface 93 that extends from the outside surface 94 of the intermediate sealing member 90 to the inside surface 95 of the intermediate sealing member 90. The radiused surface 93 has an end radius of a predetermined magnitude, desirably 0.020 inches for the example given. However, other magnitudes can be used, depending on the dimensions of the door assembly. Each of the outside surface 94 and inside surface 95 of the intermediate sealing member 90 forms a boundary that defines a transverse thickness between the outside surface 94 and the inside surface 95 wherein this thickness gradually tapers as one proceeds from the base end 91 to the radiused free end 92. In addition, as shown in FIG. 4 for example, the transverse thickness of intermediate sealing member 90 is desirably less than the thickness of inner sealing member 70 but can be of equal thickness in some embodiments.

As shown in FIG. 4 for example, intermediate sealing member 90 is configured to curve toward outer sealing member 80 and away from inner sealing member 70. The outside surface 94 of the intermediate sealing member 90 desirably has a transverse cross-section that is shaped generally as a circular arc having a radius of a predetermined magnitude, desirably 0.70 inches for the example given. However, other magnitudes can be used, depending on the dimensions of the door assembly. The inside surface 95 of the intermediate sealing member 90 has a transverse cross-section shaped generally as a circular arc having a radius that is the same as the radius of the outside surface 94 of the intermediate sealing member 90. If the magnitude of the radius of the circular arc forming the transverse cross-section of the outside surface 94 of the intermediate sealing member 90 is 0.70 inches, then the complementary radius of the inside surface 95 of the intermediate sealing member 90 is also desirably 0.70 inches.

Desirably, the intermediate sealing member 90 is composed of a material such as a flexible polyvinylchloride (PVC) or vinyl having a durometer hardness of a predetermined magnitude, which is schematically represented in FIGS. 4 and 5 by the stippling. The magnitude of the durometer hardness of the intermediate sealing member 90 is desirably Type Shore A 90, which is less than the durometer hardness of the base platform 62. Desirably, the durometer hardness of each of the inner sealing member 70, outer sealing member 80, and intermediate sealing member 90 is equal to one another. Moreover, in embodiments in which the durometer hardness of the base platform 62 on the one hand differs from that of the inner, outer and intermediate sealing members 70, 80, 90 on the other hand, a dual durometer device is provided by the present invention.

As shown in FIGS. 2 and 3, movement of the door 18 from the partially open position shown in FIG. 3 to the closed position shown in FIG. 2 results in the disposition of outer sealing member 80 in the space between the inner surface 41 of offset portion 40 of wrap-around hinge 34 and the exterior surface 43 of door receiving channel 42 of inner post 22. Properly disposed as shown in FIG. 2, a triple seal is formed. Each of inner sealing member 70 and intermediate sealing member 90 flexes inwardly toward bridge member 68 and outer sealing member 80 so that its respective outside surface 74, 94 forms a seal by resiliently pressing against exterior surface 23 of inner post 22 of the comb-style rear frame 17. Similarly, inside surface 85 of outer sealing member 80 forms a seal by resiliently pressing against exterior surface 43 of door receiving channel 42 of inner post 22 of the comb-style rear frame 17. The radiused surface 86 of foot portion 82 and the flattened off beveled surface 87 operate to guide outer sealing member 80 outward rather than letting outer sealing member 80 turn under and become disposed against exterior surface 23 of inner post 22, where outer sealing member 80 would interfere with the sealing abutment of both intermediate sealing member 90 and inner sealing member 70. In particular, when door 18 is closing, radiused surface 86 slides past the exterior surface of rear corner 45 of inner post 22. Then, as door 18 continues to move from a position as shown in FIG. 2 to a position as shown in FIG. 3, flattened off beveled surface 87 of outer sealing member 80 contacts the exterior surface of rear corner 45 of inner post 22. Because the beveled surface 87 juts off at an angle with respect to the axis of outer sealing member 80 taken in the direction in which its height is measured, the beveled surface 87 biases the movement of outer sealing member 80 toward exterior surface 43 of door receiving channel 42 of inner post 22.

It should be understood that aspects of the various embodiments may be interchanged both in whole or in part. Furthermore, those of ordinary skill in the art will appreciate that the foregoing description is by way of example only, and is not intended to be limitative of the invention so further described in the appended claims.

What is claimed is:

1. Improved sealing device, comprising:

a) a base platform configured for supporting elongated sealing members;

b) an elongated inner sealing member having a base end connected to said base platform, said inner sealing member having a free end disposed opposite said base end; and c) an elongated outer sealing member having a base end connected to said base platform, said outer sealing member having a free end disposed opposite said base end, said outer sealing member having an outside surface and an inside surface disposed opposite said outside surface, each of said outside surface and said inside surface being disposed generally parallel to one another and separated by a substantially uniform thickness, wherein said inner sealing member is composed of material having a first durometer hardness, wherein said outer sealing member is composed of material having a second durometer hardness, and wherein said first and second durometer hardness are equal.

2. A device as in claim 1, wherein:

said free end of said outer sealing member defines a beveled surface extending from said inside surface toward said outside surface.

3. A device as in claim 2, wherein:

said free end of said outer sealing member defines a radiused surface extending from said outside surface toward said inside surface and having an end radius of a first predetermined magnitude.

4. A device as in claim 1, wherein:

said free end of said outer sealing member defines a radiused surface extending from said outside surface toward said inside surface and having an end radius of a first predetermined magnitude.

5. A device as in claim 1, wherein said base platform is composed of material having a third durometer hardness that is greater than said first durometer hardness of said inner sealing member and greater than said second durometer hardness of said outer sealing member.

6. A device as in claim 1, wherein:

each of said outside surface of said outer sealing member and said inside surface of said outer sealing member has a transverse cross-section shaped generally in a curve disposed to point toward said inner sealing member.

7. A device as in claim 1, wherein:

said free end of said inner sealing member is disposed to curve toward said outer sealing member.

8. A device as in claim 1, wherein:

said inner sealing member has an outside surface and an inside surface disposed opposite said outside surface, said free end of said inner sealing member defining a radiused surface extending from said outside surface to said inside surface of said inner sealing member, said radiused surface having an end radius of a first predetermined magnitude.

9. A device as in claim 1, wherein:

said inner sealing member has an outside surface and an inside surface disposed opposite said outside surface, each of said outside surface and said inside surface of said inner sealing member forming a boundary defining a thickness between said outside surface and said inside surface of said inner sealing member, and wherein said thickness gradually tapers from said base end to said free end of said inner sealing member.

10. Improved sealing device, comprising:
   a) a base platform configured for supporting elongated sealing members;
   b) an elongated inner sealing member having a base end connected to said base platform, said inner sealing member having a free end disposed opposite said base end;
   c) an elongated outer sealing member having a base end connected to said base platform, said outer sealing member having a free end disposed opposite said base end, said outer sealing member having an outside surface and an inside surface disposed opposite said outside surface, each of said outside surface and said inside surface being disposed generally parallel to one another and separated by a substantially uniform thickness; and
   d) an elongated intermediate sealing member having a base end connected to said base platform between where said outer sealing member and inner sealing member join said base platform, said intermediate sealing member having a free end disposed opposite said base end, said free end being disposed to curve toward said outer sealing member and away from said inner sealing member.

11. A device as in claim 10, wherein said inner sealing member is composed of material having a first durometer hardness, said outer sealing member is composed of material having a second durometer hardness, and said intermediate sealing member is composed of material having a third durometer hardness.

12. A device as in claims 11, wherein said first, second and third durometer hardness are equal.

13. A device as in claim 1, wherein said base platform defines a generally U-shaped transverse cross-section including an outer leg with an inside surface, an inner leg with an inside surface disposed to face said inside surface of said outer leg, and a bridge member extending between and being joined to each of said legs.

14. A device as in claim 13, further comprising:
   a first elongated and resilient bumper strip disposed along the length of said inside surface of said outer leg of said base platform;
   a second elongated and resilient bumper strip disposed along the length of said inside surface of said inner leg of said base platform.

15. Improved sealing apparatus, comprising:
   a) a base platform configured for supporting elongated sealing members;
   b) an elongated outer sealing member having a base end connected to said base platform, said outer sealing member having a free end disposed opposite said base end;
   c) an elongated inner sealing member having a base end connected to said base platform, said inner sealing member having a free end disposed opposite said base end; and
   d) an elongated intermediate sealing member having a base end connected to said base platform between where said outer sealing member and said inner sealing member join said base platform, said intermediate sealing member having a free end disposed opposite said base end,
   wherein said inner sealing member, said intermediate sealing member and said outer sealing member are composed of material having equal durometer hardness.

16. Apparatus as in claim 15, wherein said outer sealing member has a main body portion defining an outside surface and an inside surface disposed opposite said outside surface, each of said outside surface and said inside surface being disposed generally parallel to one another and separated by a substantially uniform thickness.

17. Apparatus as in claim 15, wherein said free end of said intermediate member is configured to curve toward said outer sealing member and away from said inner sealing member.

18. Apparatus for transporting cargo, comprising:
   a) a container;
   b) a comb-style rear frame defining at least one opening through which cargo can pass into and out of said container;
   c) a door having generally planar interior and exterior sides;
   d) a hinge having a first end connected to said frame and having a second end connected to said door such that said door is movable by said hinge with respect to said frame to a closed position in which said door at least partially blocks said opening and in which a free edge of said door opposes a first vertical surface of said frame; and
   e) a sealing gasket, said sealing gasket including
      i) a base platform connected to said free edge of said door,
      ii) a resilient elongated inner sealing member having a base end connected to said base platform and a free end disposed opposite said base end, said inner member free end engaging said frame first surface when said door is in said closed position, and
      iii) a resilient elongated outer sealing member having a base end connected to said base platform, said outer sealing member having a free end disposed opposite said base end, said outer sealing member having a main body portion defining an outside surface and an inside surface disposed opposite said outside surface, each of said outside surface and said inside surface being disposed generally parallel to one another and separated by a substantially uniform thickness,
         wherein said outer member free end engages a second vertical surface of said frame that is generally parallel to said door interior and exterior sides,
         wherein said inner sealing member is composed of material having a first durometer hardness, wherein said outer sealing member is composed of material having a second durometer hardness, and wherein said first and second durometer hardness are equal.

19. The apparatus as in claim 18, wherein said free end of said inner member curves toward said outer member.

20. Apparatus for transporting cargo, comprising:
   a) a container;
   b) a comb-style rear frame defining at least one opening through which cargo can pass into and out of said container;

c) a door having generally planar interior and exterior sides;
d) a hinge having a first end connected to said frame and having a second end connected to said door such that said door is movable by said hinge with respect to said frame to a closed position in which said door at least partially blocks said opening and in which a free edge of said door opposes a first surface of said frame;
e) at least one rear door connected to said second butt of said wrap-around hinge, said door having a free edge; and
f) a sealing gasket, said sealing gasket including
   i) a base platform connected to said free edge of said door,
   ii) a resilient elongated outer sealing member having a base end connected to said base platform and a free end disposed opposite said base end, said outer member free end engaging a second surface of said frame that is generally parallel to said door interior and exterior sides when said door is in said closed position,
   iii) a resilient elongated inner sealing member having a base end connected to said base platform and a free end disposed opposite said base end, said inner member free end engaging said frame first surface when said door is in said closed position, and
   iv) a resilient elongated intermediate sealing member having a base end connected to said base platform between where said outer sealing member and said inner sealing member join said base platform, said intermediate sealing member having a free end disposed opposite said base end and engaging said frame first surface when said door is in said closed position.

21. The apparatus as in claims 20, wherein said free ends of each of said inner and intermediate members curve toward said outer member.

22. The apparatus as in claim 20, wherein said outer member, said inner member and said intermediate member have an equal durometer hardness that is less than the durometer hardness of said base platform.

23. An apparatus for transporting cargo, the apparatus comprising:
(a) a container;
(b) a door having a free edge and having opposed interior and exterior planar surfaces;
(c) a comb-style rear frame defining at least one opening through which cargo can pass, said frame including
   i) a rearwardly extending comb member,
   ii) a leaf portion defining a plane surface disposed to face the exterior surface of the door,
   iii) a rearward portion extending off-set rearwardly from said plane surface of said leaf portion,
   iv) a normal leg extending generally transversely from said rearward portion, and
   v) a parallel leg extending generally transversely from said normal leg and having a free end pivotally connected to the comb member; and
e) a sealing gasket, said sealing gasket including
   i) a base platform connected to said free edge of said door,
   ii) a resilient elongated inner sealing member having a base end connected to said base platform and a free end disposed opposite said base end, said inner member free end engaging a first vertical surface of said frame opposite said door free edge when said door is in a closed position in which said door at least partially blocks said opening, and
   iii) a resilient elongated outer sealing member having a base end connected to said base platform, said outer sealing member having a free end disposed opposite said base end, said outer sealing member having a main body portion defining an outside surface and an inside surface disposed opposite said outside surface, each of said outside surface and said inside surface being disposed generally parallel to one another and separated by a generally uniform thickness,
      wherein said outer member free end engages a second vertical surface of said frame that is generally parallel to said door interior and exterior surfaces,
      wherein said inner sealing member is composed of material having a first durometer hardness,
      wherein said outer sealing member is composed of material having a second durometer hardness, and
      wherein said first and second durometer hardness are equal.

24. An apparatus as in claim 23, further comprising:
e) a pair of spaced apart hinge ends connected to a rearward leg of the comb member, each hinge end defining a hinge pin opening disposed concentrically of each other.

25. An apparatus as in claim 24, wherein said normal leg is configured such that said plane surface of said leaf portion is disposed in substantially the same plane as said second surface of said frame when said normal leg is disposed to face a rearward leg of the comb member, and a hinge pin is disposed through said hinge pin openings in said hinge ends and in said parallel leg.

26. An apparatus for transporting cargo, the apparatus comprising:
a) a container;
b) a door having opposed interior and exterior planar surfaces;
c) a comb-style rear frame defining at least one opening through which cargo can pass, said frame including
   i) a vertically extending inner post, said inner post defining an inner wall and a door receiving channel extending generally transversely from said inner wall and defining a generally rearward facing exterior surface,
   ii) a vertically extending comb member defining a rearward leg extending rearwardly from said exterior surface and a rear flange connected to said rearward leg and extending generally transversely to said rearward leg,
   iii) at least one wrap-around hinge defining a leaf portion with a plane surface disposed to face the exterior surface of the door, said leaf portion further defining a rearward portion extending off-set rearwardly from said plane surface of said leaf portion, said hinge further defining a normal leg extending generally transversely from said rearward portion, said hinge further defining a parallel leg extending generally transversely from said normal leg and having a free end defining a hinge pin opening therein,
   iv) a hinge end connected to said comb member so that said hinge end is disposed forward of said rear flange, said hinge end defining a vertical hinge pin opening, and
   v) a hinge pin disposed through said hinge pin opening in said hinge end and said parallel leg of said hinge, wherein said plane surface of said leaf portion is disposed in substantially the same plane as said exterior surface of said door receiving channel when said normal leg of said hinge is disposed to face said rearward leg of said comb member; and d) a sealing gasket, said sealing gasket including
  i) a base platform connected to a free edge of said door, said free edge being opposite said post inner wall when said door is in a closed position in which said door at least partially blocks said opening,
  ii) a resilient elongated outer sealing member having a base end connected to said base platform and a free end disposed opposite said base end, said outer member free end engaging said channel exterior surface when said door is in said closed position,
  iii) a resilient elongated inner sealing member having a base end connected to said base platform and a free end disposed opposite said base end, said inner member free end engaging said post inner surface when said door is in said closed position, and
  iv) a resilient elongated intermediate sealing member having a base end connected to said base platform between where said outer sealing member and said inner sealing member join said base platform, said intermediate member having a free end disposed opposite said base end and engaging said post inner surface when said door is in said closed position.

27. The apparatus as in claim 26, wherein said free ends of each of said inner and intermediate members curve toward said outer member.

28. The apparatus as in claim 26, wherein said outer member, said inner member and said intermediate member have an equal durometer hardness that is less than the durometer hardness of said base platform.

* * * * *